United States Patent
Yokoe

(10) Patent No.: US 6,654,139 B1
(45) Date of Patent: Nov. 25, 2003

(54) PRINTER SYSTEM WITH IMAGE PROCESSING SYSTEM IN WHICH DRAWING OPERATIONS ARE EXECUTED IN PARALLEL

(75) Inventor: Takeshi Yokoe, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/435,760

(22) Filed: Nov. 8, 1999

(30) Foreign Application Priority Data

Nov. 11, 1998 (JP) .......................................... 10-320496

(51) Int. Cl.⁷ .............................................. G06F 15/00
(52) U.S. Cl. ....................................... 358/1.15; 358/1.1
(58) Field of Search ........................ 358/1.1, 1.9, 1.12, 358/1.13, 1.14, 1.15, 1.16, 1.17, 1.18, 442, 448

(56) References Cited

U.S. PATENT DOCUMENTS 5,708,763 A  *  1/1998  Peltzer .......................  358/1.16
6,067,097 A  *  5/2000  Morita et al. ..................  358/1.1

FOREIGN PATENT DOCUMENTS

| JP | 63-173121 | 7/1988 |
| JP | 4-262417 | 9/1992 |
| JP | 6-149989 | 5/1994 |
| JP | 6-214555 | 8/1994 |
| JP | 8-123633 | 5/1996 |
| JP | 9-1871 | 1/1997 |
| JP | 9-58091 | 3/1997 |
| JP | 9-185508 | 7/1997 |
| JP | 10-49315 | 2/1998 |
| JP | 10-58770 | 3/1998 |
| JP | 2757641 | 3/1998 |
| JP | 10-151815 | 6/1998 |
| JP | 11-147344 | 6/1999 |
| JP | 11-170626 | 6/1999 |
| JP | 2000132349 | 5/2000 |

OTHER PUBLICATIONS

Japanese Office Action issued Jul. 21, 2000 in a related application with English–language translation of relevant portions.

* cited by examiner

*Primary Examiner*—Mark Wallerson
(74) *Attorney, Agent, or Firm*—Dickstein, Shapiro, Morin & Oshinsky, LLP.

(57) ABSTRACT

A printer system with an image processing unit includes a separating section, a plurality of drawing sections and an output controller. The separating section divides drawing instructions for a full image data into lists of drawing instructions for partial image data corresponding to blocks. The plurality of drawing sections executes the lists of drawing instruction to produce the partial image data for the blocks. The output controller sequentially reads out the partial image data based on a block position such that the full image data is outputted.

15 Claims, 5 Drawing Sheets

Fig. 3A
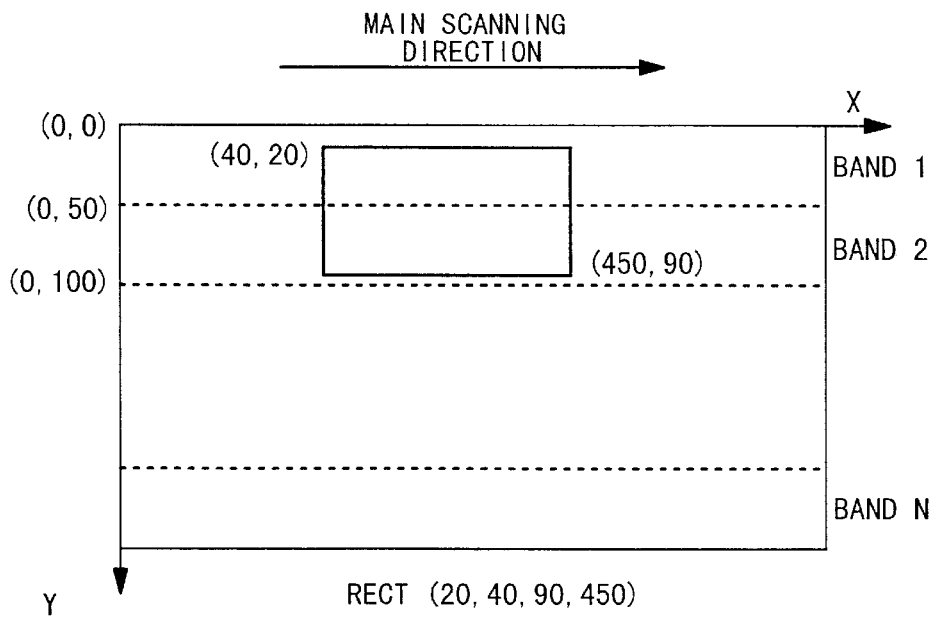
RECT (20, 40, 90, 450)
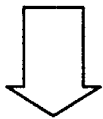
Fig. 3B
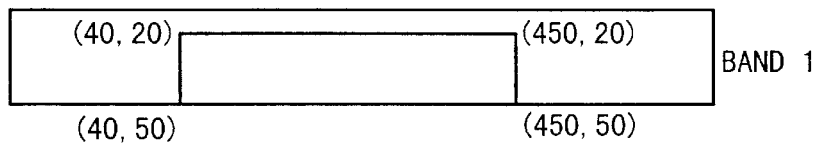
LINE (40, 20, 40, 50)
LINE (40, 20, 450, 20)
LINE (450, 20, 450, 50)
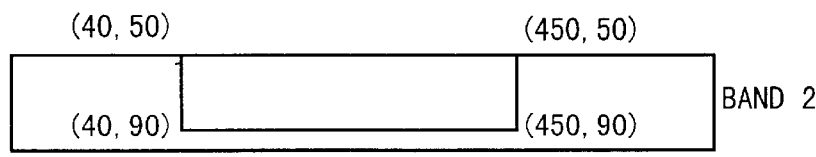
LINE (40, 50, 40, 90)
LINE (40, 90, 450, 90)
LINE (450, 90, 450, 50)

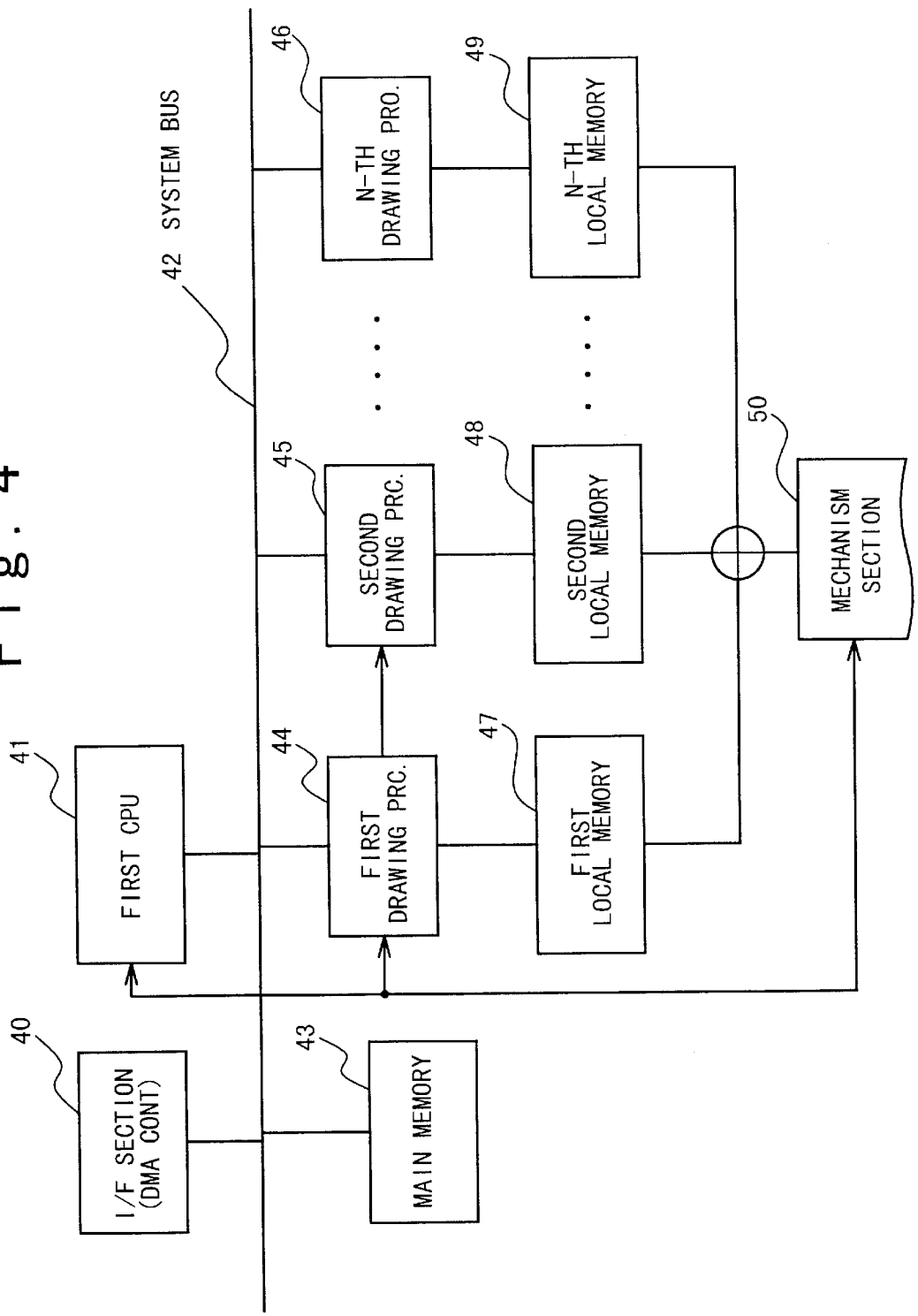

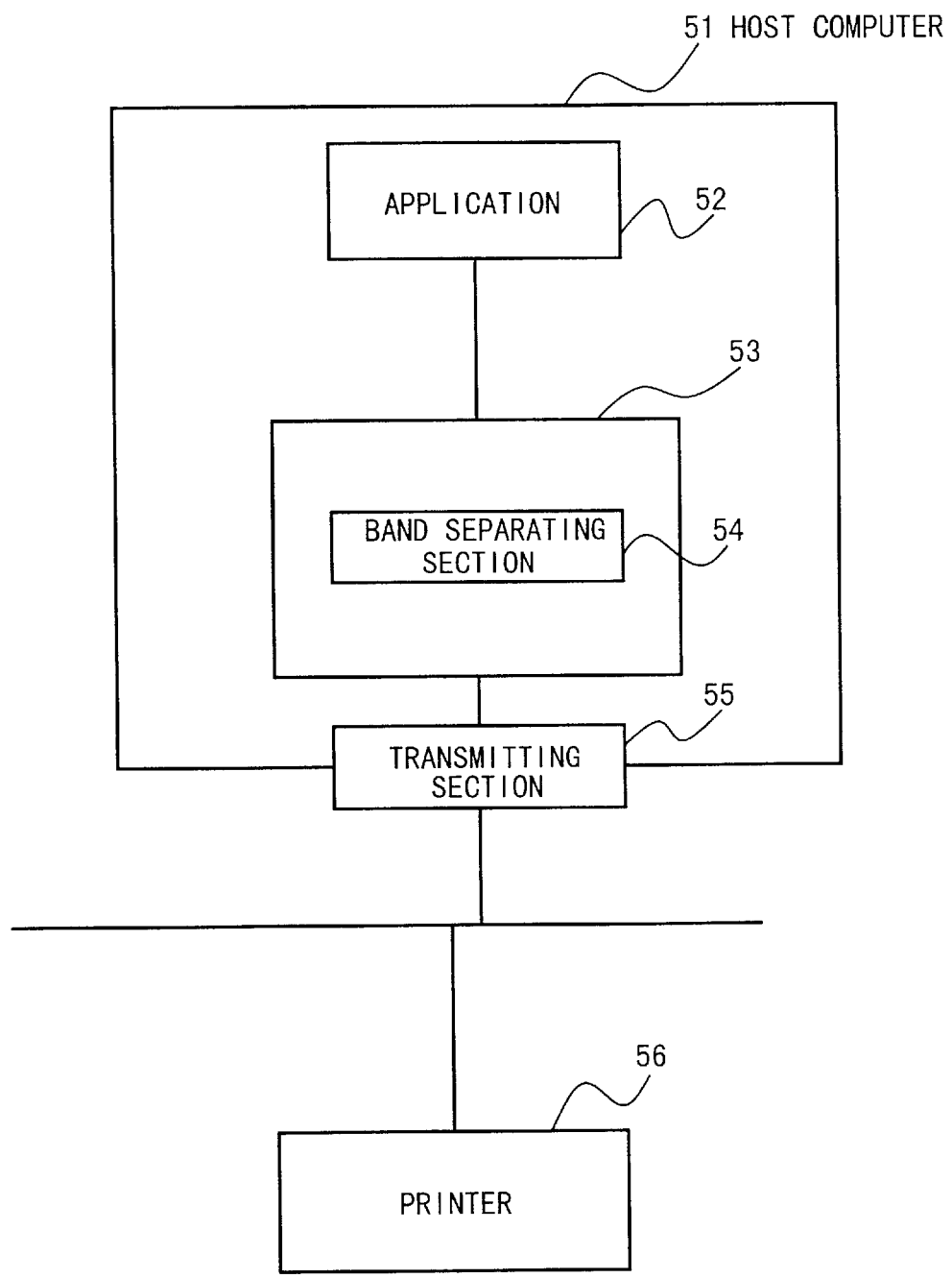

PRINTER SYSTEM WITH IMAGE PROCESSING SYSTEM IN WHICH DRAWING OPERATIONS ARE EXECUTED IN PARALLEL

BACKGROUND OF THE INVENTION

1. Field of the Invention

The present invention relates an image processing system and a printer system using the same, and more particularly to an image processing system in which drawing operations are executed in parallel and a printer system using the same.

2. Description of the Related Art

A conventional example of an image processing system is composed of three image processors provided for color images, image processors manipulating an overlay image independent from the color images, and local memories. The drawing processors are possible to operate in accordance with the same system clock, and draw four images in the local memories at a time, resulting in a drawing output at high speed.

However, there are the following problems in the conventional example of the image processing system. That is, in case that a plurality of image processors are used, the system configuration of the image processing system is limited in accordance with the number of colors. In the above example, the image processing system needs to have the three image processors for carrying out parallel processing of the color images other than an image processor for the overlay image. However, the system configuration with three or more image processors is difficult in the above reference. Also, in an output unit such as a printer which uses a color mixing method of C (cyanine), M (magenta), and Y (Yellow), it is difficult to divide the image in color and then to draw in the local memories.

Generally, it is not possible to output black beautifully in the three colors C, M and Y. For this reason, K (black) is often provided independently from the three colors C, M and Y. In this K image production, after the CMY image, the K image production and the correction of C, M and Y are necessitated in accordance with UCR (Under Color Removal). In this case, calculations such as K=f(C,M,Y), C=C−f(C,M,Y), M=M−f(C,M,Y), Y=Y−f(C,M,Y) are carried out.

In conjunction with the above description, an image processing apparatus is described in Japanese Laid Open Patent Application (JP-A-Heisei 6-149989). In this reference, a convolution calculation circuit carries out convolution calculations to a plurality of blocks divided from a composite image signal in parallel using a plurality of image processors (46a to 46d). An inter-image calculation circuit carries out inter-image calculations to the plurality of blocks divided from the composite image signal in parallel using the plurality of image processors (46a to 46d). A switching circuit (143) selectively switches between the convolution calculations and the inter-image calculations.

Also, an image processing is described in Japanese Laid Open Patent Application (JP-A-Heisei 6-214555). In this reference, a plurality of drawing commands issued from a host computer (1) are distributed to a plurality of drawing modules (M1, M2, . . . ) by a control processor (31). The drawing modules (M1, M2, . . . ) execute the plurality drawing commands in parallel to produce and output data for every pixel. A pixel processor (32) selects one of the output data from the drawing modules (M1, M2, . . . ) to supply to a display processor (33). The display processor (33) converts the supplied data into an analog signal and outputs to a CRT (2) as a video signal. Thus, the image processing is carried out effectively at high speed without mixture of images.

Also, a color image processing is described in Japanese Patent No. 2757641. In this reference, first to third image processors are allocated to color components, have the same architecture and execute the same program with the same clock such that a color image is processed in units of color components in parallel. First to third image memories are connected to the first to third image processors by local buses and store data to be processed or to have been processed by the first to third image processors for every color component. A fourth image processor for an overlay image has the same architecture as the first to third image processors and executes the same program with the same clock as the first to third image processors. A fourth image memory has the same memory structure as the first to third image memories, and is connected to the fourth image processor by a local bus. A host processor is connected to the first to fourth image processors by a system bus and starts control programs of the first to fourth image processors simultaneously or individually in accordance with a specifying content of a control table for control and management of the first to fourth image processors. The overlay image is processed independently from the color image.

SUMMARY OF THE INVENTION

Therefore, an object of the present invention is to provide an image processing system in which drawing operations can be carried out in parallel.

Another object of the present invention is to provide an image processing system in which a drawing instruction is divided into a plurality of new drawing instructions when the drawing instruction is over blocks or bands.

Still object of the present invention is to provide a printer system using any of the above image processing systems.

In order to achieve an aspect of the present invention, an image processing system includes a separating section, a plurality of drawing sections and an output controller. The separating section divides drawing instructions for a full image data into lists of drawing instructions for partial image data corresponding to blocks. The plurality of drawing sections executes the lists of drawing instruction to produce the partial image data for the blocks. The output controller sequentially reads out the partial image data based on a block position such that the full image data is outputted.

Here, the separating section determines whether each of the drawing instructions is associated with two or more of the blocks. The separating section converts the drawing instruction into a plurality of drawing instructions when the drawing instruction is associated with two or more of the blocks, and then separates the drawing instructions including the converted drawing instruction in place of the drawing instruction in units of blocks to produce the lists of drawing instructions.

When the number of the blocks is equal to the number of the drawing sections, the plurality of drawing sections execute the lists of drawing instructions in parallel.

When the number of the blocks is more than the number of the drawing sections, the plurality of drawing sections execute the lists of drawing instructions in parallel in units of sets of blocks corresponding to the drawing sections.

The separating section may give the lists of drawing sections to the plurality of drawing sections in order of positions of blocks in the full image data. In this case, the separating section may give a remaining one of the lists of drawing sections to one of the plurality of drawing sections, when the one drawing section ends execution of the given lists of drawing instructions.

The separating section may be provided in a host computer, and the plurality of drawing sections and the output controller are provided in an image processing apparatus connected to the host computer via a network.

In order to achieve another aspect of the present invention, a printer system includes a separating section, a plurality of drawing sections, an output controller and a printer mechanism. The separating section divides drawing instructions for a full image data into lists of drawing instructions for partial image data corresponding to blocks. The plurality of drawing sections execute the lists of drawing instruction to produce the partial image data for the blocks. The output controller sequentially reads out the partial image data based on a block position such that the full image data is outputted, when all the partial image data are drawn. The printer mechanism prints the full image data based on the read out partial image data.

The separating section determines whether each of the drawing instructions is associated with two or more of the blocks, converts the drawing instruction into a plurality of drawing instructions when the drawing instruction is associated with two or more of the blocks, and separates the drawing instructions including the converted drawing instruction in place of the drawing instruction in units of blocks to produce the lists of drawing instructions.

When the number of the blocks is equal to the number of the drawing sections, the plurality of drawing sections execute the lists of drawing instructions in parallel.

When the number of the blocks is more than the number of the drawing sections, the plurality of drawing sections execute the lists of drawing instructions in parallel in units of sets of blocks corresponding to the drawing sections.

The separating section may give the lists of drawing sections to the plurality of drawing sections in order of positions of blocks in the full image data. In this case, the separating section may give a remaining one of the lists of drawing sections to one of the plurality of drawing sections, when the one drawing section ends execution of the given lists of drawing instructions.

The separating section may be provided in a host computer, and the plurality of drawing sections and the output controller may be provided in a printer connected to the host computer via a network.

In order to still another aspect of the present invention, a printer system includes a separating section, a plurality of drawing sections, an output controller and a printer mechanism. The separating section divides an region for a full image data into blocks for partial image data with conversion of drawing instruction. The plurality of drawing sections draw the partial image data for the blocks. The output controller sequentially reads out the partial image data based on a block position such that the full image data is outputted, when all the partial image data are drawn. The printer mechanism prints the full image data based on the read out partial image data.

BRIEF DESCRIPTION OF THE DRAWINGS

FIGS. 3A and 3B are diagrams showing a dividing operation of drawing instructions in units of bands;

FIG. 4 is a block diagram showing the structure of the printer system according to a second embodiment of the present invention; and FIG. 5 is a block diagram showing a host computer in the printer system according to the second embodiment of the present invention.

DESCRIPTION OF THE PREFERRED EMBODIMENTS

Hereinafter, a printer system with an image processing unit of the present invention will be described below in detail with reference to the attached drawings.

Figure 1:
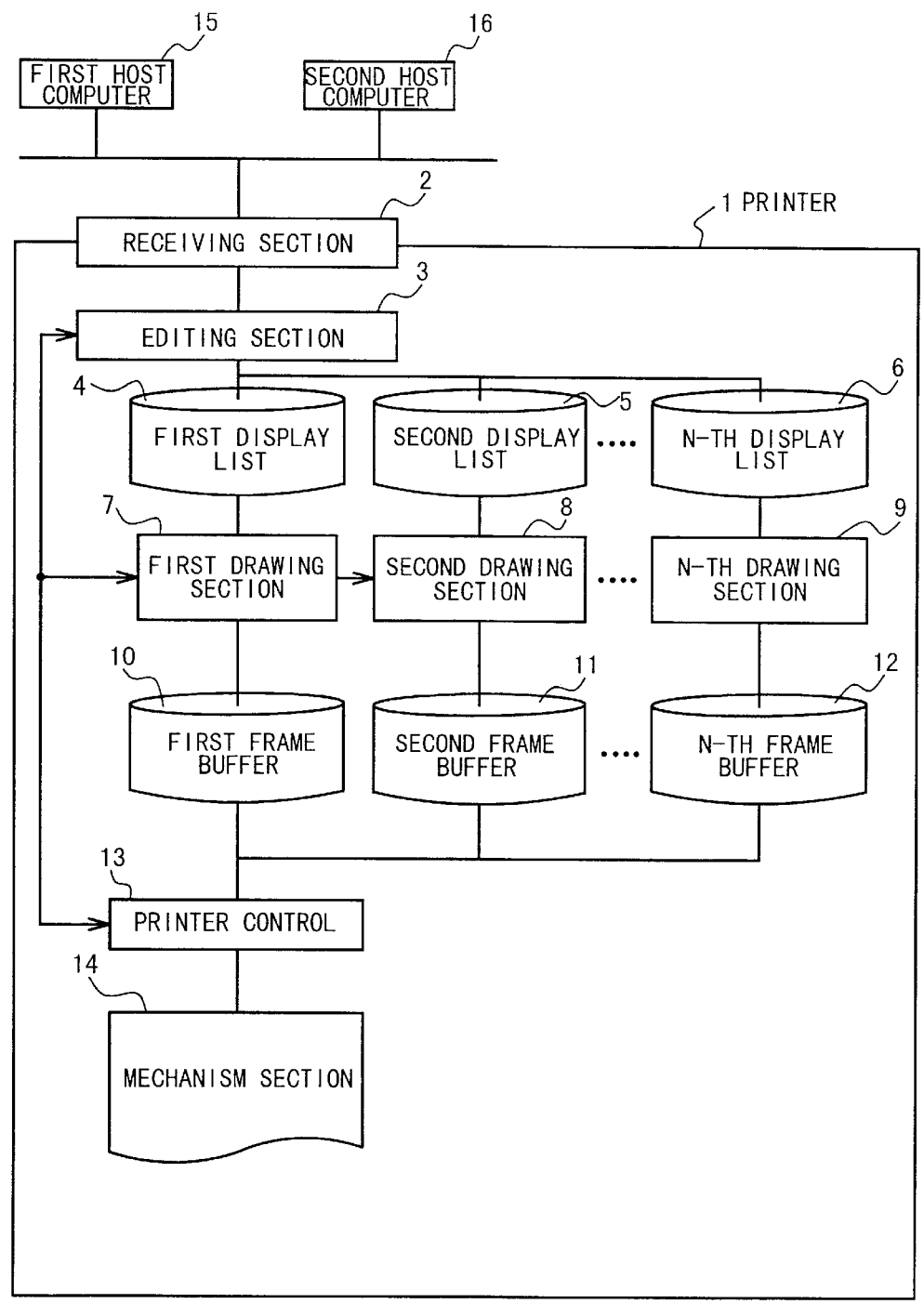
FIG. 1 is a block diagram showing the structure of a printer system according to a first embodiment of the present invention.

FIG. 1 is a block diagram showing the structure of a printer system according to the first embodiment of the present invention. Referring to FIG. 1, the printer system is composed of a first host computer 15, a second host computer and a printer 1 which are connected through a network, communication line or bus to each other. The printer 1 in the first embodiment is composed of a receiving section 2, an editing section 3, first to n-th display list storage sections 4 to 6, first to n-th drawing sections 7 to 9, first to n-th frame buffers 10 to 12, a print mechanism section 14, and a print control unit 13.

The receiving section 2 receives print instructions. The editing section 3 produces a display list from the received print instructions in units of bands which are cut in a main scanning direction of a printing operation. The first to n-th display list storage sections 4 to 6 store the display lists produced in units of bands by the editing section 3. Each of the first to n-th drawing sections 7 to 9 carries out drawing operations in accordance with the drawing instructions of the display list which has been stored in a corresponding one of the first to n-th display list storage sections 4 to 6. The first to n-th frame buffers 10 to 12 store bit image data drawn by the first to n-th drawing sections 7 to 9. The print control unit 13 controls the print mechanism section 14 in response to a drawing operation end notice such that bit image data which have been stored in the frame buffers 10 to 12 are printed.

Also, the first drawing section 7, the second drawing section 8, the n-th drawing section 9 are possible to carry out the drawing operations independently from each other using a CPU or coprocessor other than the CPU for controlling the whole printer, respectively.

Next, the operation of the printer system of FIG. 1 in the first embodiment will be described with reference to FIG. 2, FIG. 3 and FIG. 4.

Figure 2:
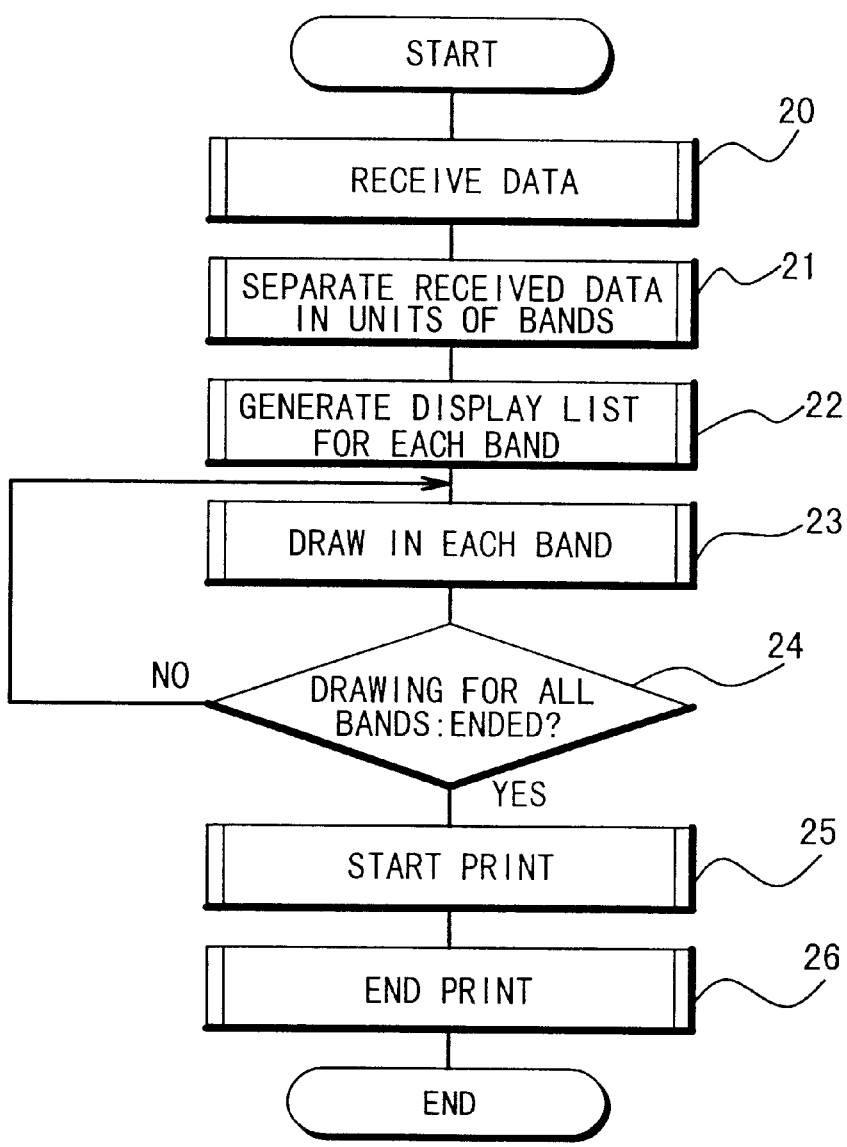
FIG. 2 is a flow chart showing the operation of the printer system according to the first embodiment of the present invention.

The printer 1 receives print data or a sequence of drawing instructions from a host computer 15 or 16 connected with the network through the receiving section 2 (step 20 of FIG. 2). At this time, the editing section 3 receives the sequence of drawing instructions from the receiving section 2, and carries out an analysis and edition process to the sequence of drawing instructions. In the analysis and edition process, the editing section 3 calculates a time cost of each of the drawing instructions, i.e., a time required to execute the drawing instruction. Then, the editing section separates the sequence of drawing instructions into display lists of drawing instructions based on the number of drawing sections and the calculated time costs. In the analysis and edition process, the drawing instruction decomposing process to be described below is contained.

In the drawing process in the printer 1, the following method is adopted to increase the memory use efficiency of the mounted memories. That is, the sequence of drawing instructions are separated along Y direction in FIG. 3A into a direction parallel to a main scanning direction (X direction in FIG. 3A), and a print region corresponding to the sequence of drawing instructions is divided into blocks (to be referred to as bands, hereinafter). Therefore, the bands may be equal to each other in height. In this case, the drawing operation and a memory area management become easy. Also, the bands may be different from each other such that the drawing operation times by the drawing sections are approximately equal to each other. At this time, the editing section 3 decomposes each of the drawing instructions of the sequence when a figure or drawing extends over two or more bands. That is, the editing section 3 decomposes the drawing instruction in accordance with the band height to make a redundant drawing operation minimum. The drawing operation is carried out to a corresponding one of the frame buffers 10 to 12 by a corresponding one of the drawing sections 7 to 9.

For example, as shown in FIG. 3A, a full image data corresponding to the sequence of drawing instructions is divided into band image data with the height of 50. It is supposed that a rectangle drawing instruction RECT (40, 20, 450, 9) is contained in the sequence of drawing instructions to draw a rectangle with a line width 1 over the band 1 and the band 2. In this case, the rectangle drawing instruction RECT is divided into line drawing commends Line (40, 20, 40 ,50), Line (40, 20, 450, 20) and Line (450, 20, 450, 50) for the band 1 and line drawing instructions Line (40, 50, 40, 90), Line (40, 90, 450, 90) and Line (450, 90, 450, 50) for the band 2, as shown in FIG. 3B (step 21 of FIG. 2).

In this way, an instruction decomposing process is carried out to each drawing instruction over the bands based on the number of drawing sections and the time costs. The display lists of drawing instructions obtained through the instruction decomposing process are stored in the display list storage units 4 to 6 (step 22 of FIG. 2).

In the above-mentioned editing process, when the display list is completed for every band, each of the drawing sections 7 to 9 starts the drawing operation in order from the completed display list for every band in response to a drawing operation start instruction from the editing section 3. When the drawing operation for the display list of drawing instructions is ended, each of the drawing sections 7 to 9 starts the drawing operation to the other display list which has been completed but not yet drawn. This operation is repeated (steps 23 to 24 of FIG. 2).

When it is confirmed that the drawing processes for all the bands, the printing operation is started by the printer controller 13 in response to a printing operation start instruction (step 25 of FIG. 2). At this time, because the printer 1 has the n drawing sections from the first drawing section 7 to the n-th drawing section 9, the n drawing operations at a maximum are possible to be carried out in parallel. As a result, the drawing operation can be carried out at high speed. Also, at this time, in FIG. 1, the editing section 3 produces the display list for every band, and the plurality of drawing sections 7 to 9 carry out the drawing operations based on the display lists. The frame buffers 10 to 12 are sufficient to have a storage capacity for the band, so that the frame buffers 10 to 12 can be made small. However, when each frame buffer has the storage capacity for one frame, the degree of freedom in the separating operation of the sequence of drawing instructions by the editing section 3 can be increased.

Next, a printer of the printer system according to the second embodiment of the present invention will be described with reference to FIG. 4. Referring to FIG. 4, the printer 1 is composed of a first CPU 41, a main memory 43, an interface (I/F) section 40, drawing processors 44 to 46, and local memories 47 to 49. The first CPU 41 controls the whole printer 1. The main memory 43 is a storage section for the first CPU 41 and is necessary to manage data processing and the printer operation. The interface (I/F) section 40 receives the print data or the sequence of drawing instructions from a network. The drawing processors 44 to 46 carry out the drawing operations to the local memories 47 to 49 in response to the drawing operation start instructions from the first CPU 41, respectively. The local memories 47 to 49 correspond to the frame buffer 10 to 12 in FIG. 1.

First, the first CPU 41 receives the print data or the sequence of drawing instructions from the host computer through the I/F section 40 (step 20 of FIG. 2). At this time, the first CPU 41 carries out-only the start control and state control of a DMA controller which is in the I/F section 40, so that the processing load on the first CPU 41 is light. The first CPU 41 can execute another processing in addition to the above control. The first CPU 41 decomposes the sequence of drawing instructions in units of bands in approximately parallel to the data reception (step 21 of FIG. 2) to carry out the editing process so that the display list is produced for every band (step 22 of FIG. 2). At this time, the produced display list for each band is written in the main memory 43 which can be accessed by the first CPU 41 and the plurality of drawing processors.

Each time the production of the display list for each band is completed, the first CPU 41 issues the drawing operation start instruction to any of the drawing processors 44 to 46. The drawing processors 44 to 46 start the drawing operations of the corresponding ones of the bands in response to the drawing operation start instructions, respectively (step 23). Because the drawing operations are respectively carried out to the local memories 47 to 49 by the drawing processors 44 to 46, the drawing operations can be carried out in parallel to each other. When completing the drawing operations, each of the drawing processors 44 to 46 notify to completion of the drawing operation to the first CPU 41 by use of an interrupt signal, and the first CPU recognizes that the drawing processor which has issued the interrupt signal is free. The first CPU 41 checks whether any display list is remained in the main memory, in response to the interrupt signal. When there is any display list in the main memory, the first CPU 41 issues the drawing operation start instruction to the issuing drawing processor again. This operation is repeated (step 23 to 24) and the drawing process for one page is ended. At this time, the printing operation start instruction is issued from the first CPU 41 to the mechanism section 50 and the printing operation is started (step 25).

In the above-mentioned structure, the drawing processor carries out the drawing operation. However, the drawing operation may be carried out by a coprocessor or a custom LSI with a drawing function. Also, in the above description, the printing operation is started after all the drawing operations are completed. However, the printing operation of an image to the print mechanism section may be carried out in parallel to the drawing operations for the display lists of the bands, in case where it is possible to carry out the drawing operations at high speed sufficiently rather than the printing operation.

Next, the printer system according to the third embodiment of the present invention will be described below with reference to FIG. 5. Referring to FIG. 5, in the printer system according to the third embodiment of the present invention, the printer 56 has basically the same structure as the printer 1 shown in FIG. 1. In the third embodiment, the host computer 51 of FIG. 5 includes an application program 52 for producing the print data, a printer driver 53 for converting the print data or the sequence of drawing instructions in a printer language which the printer 56 is possible to analyze, and a band separating section 54 for dividing the sequence of drawing instructions in the printer language in units of bands. The host computer 51 is connected with the printer 56 through the network, as in FIG. 1.

Next, the operation of the printer system in the third embodiment of the present invention will be described below.

In the host computer 51 of FIG. 5, the application 52 operating on the host computer 51 produces the sequence of drawing instructions as the print data. The printer driver 53 converts the sequence of drawing instructions in the printer language which the printer 56 is possible to analyze. The band separating section 54 divides the sequence of drawing instructions into the display lists of drawing instructions in units of bands. The band has a height easy for the printer to process the display lists of drawing instructions.

On the other hand, the display lists of drawing instructions are transmitted to the printer 56 through the transmitting section of the host computer, and the printer 56 receives the display lists of drawing instructions. In the third embodiment, because the sequence of drawing instructions already divided in units of bands is transmitted, there is not necessary the band dividing or separating process by the editing section in the printer 56. The display lists can be distributed to the drawing sections in the printer 56 at very high speed.

In the above description, when a display controller is used in place of the printer controller 13 and a display unit is used in place of the mechanism section 14, the present invention can be applied to the image processing system.

As described above, according to the printer system of the present invention, the printing process efficiency of the printer is improves by providing the plurality of drawing sections. The drawing time can be reduced because the plurality of drawing processor operates in parallel.

Also, it becomes possible to select the hardware structure in accordance with a requested efficiency because the drawing time can be short in accordance with the number of drawing processors. This is because the estimation of the drawing time by the editing section is proportional to the number of drawing sections.

What is claimed is:

1. An image processing system comprising:
    a separating section dividing drawing instructions for a full image data into lists of drawing instructions for partial image data corresponding to blocks;
    a plurality of drawing sections executing said lists of drawing instruction to produce said partial image data for said blocks; and
    an output controller sequentially reading out said partial image data based on a block position such that said full image data is outputted.

2. An image processing system according to claim 1, wherein said separating section determines whether each of said drawing instructions is associated with two or more of said blocks, converts said drawing instruction into a plurality of drawing instructions when said drawing instruction is associated with two or more of said blocks, and separates said drawing instructions including said converted drawing instruction in place of said drawing instruction in units of blocks to produce said lists of drawing instructions.

3. An image processing system according to claim 1, wherein a number of said blocks is equal to a number of said drawing sections, and
    wherein said plurality of drawing sections execute said lists of drawing instructions in parallel.

4. An image processing system according to claim 1, wherein a number of said blocks is more than a number of said drawing sections, and
    wherein said plurality of drawing sections execute said lists of drawing instructions in parallel in units of sets of blocks corresponding to said drawing sections.

5. An image processing system according to claim 1, wherein said separating section gives said lists of drawing sections to said plurality of drawing sections in order of positions of blocks in said full image data.

6. An image processing system according to claim 5, wherein said separating section gives a remaining one of said lists of drawing sections to one of said plurality of drawing sections, when said one drawing section ends execution of said given lists of drawing instructions.

7. An image processing system according to claim 1, wherein said separating section is provided in a host computer, and
    said plurality of drawing sections and said output controller are provided in an image processing apparatus connected to said host computer via a network.

8. A printer system comprising:
    a separating section dividing drawing instructions for a full image data into lists of drawing instructions for partial image data corresponding to blocks;
    a plurality of drawing sections executing said lists of drawing instruction to produce said partial image data for said blocks;
    an output controller sequentially reading out said partial image data based on a block position such that said full image data is outputted, when all said partial image data are drawn; and
    a printer mechanism printing said full image data based on said read out partial image data.

9. A printer system according to claim 8, wherein said separating section determines whether each of said drawing instructions is associated with two or more of said blocks, converts said drawing instruction into a plurality of drawing instructions when said drawing instruction is associated with two or more of said blocks, and separates said drawing instructions including said converted drawing instruction in place of said drawing instruction in units of blocks to produce said lists of drawing instructions.

10. A printer system according to claim 8, wherein a number of said blocks is equal to a number of said drawing sections, and
    wherein said plurality of drawing sections execute said lists of drawing instructions in parallel.

11. A printer system according to claim 8, wherein a number of said blocks is more than a number of said drawing sections, and
    wherein said plurality of drawing sections execute said lists of drawing instructions in parallel in units of sets of blocks corresponding to said drawing sections.

12. A printer system according to claim 8, wherein said separating section gives said lists of drawing sections to said plurality of drawing sections in order of positions of blocks in said full image data.

13. A printer system according to claim 12, wherein said separating section gives a remaining one of said lists of drawing sections to one of said plurality of drawing sections, when said one drawing section ends execution of said given lists of drawing instructions.

14. A printer system according to claim 8, wherein said separating section is provided in a host computer, and said plurality of drawing sections and said output controller are provided in a printer connected to said host computer via a network.

15. A printer system comprising:

a separating section dividing an region for a full image data into blocks for partial image data with conversion of drawing instruction;

a plurality of drawing sections drawing said partial image data for said blocks;

an output controller sequentially reading out said partial image data based on a block position such that said full image data is outputted, when all said partial image data are drawn; and a printer mechanism printing said full image data based on said read out partial image data.

* * * * *